United States Patent [19]

Frank et al.

[11] 4,342,684
[45] Aug. 3, 1982

[54] HYDROSOLUBLE PYRAZOLONE TRISAZO DYESTUFFS DERIVED FROM 4,4′-DIAMINO-BENZENESULFANILIDE

[75] Inventors: Pierre Frank; André L. Sailer, both of Saint Clair du Rhone, France

[73] Assignee: P C U K Produits Chimiques Ugine Kuhlmann, Courbevoie, France

[21] Appl. No.: 772,897

[22] Filed: Feb. 28, 1977

Related U.S. Application Data

[63] Continuation of Ser. No. 541,956, Jan. 17, 1975, abandoned.

[30] Foreign Application Priority Data

Jan. 22, 1974 [FR] France .................... 74 02017

[51] Int. Cl.³ ............... C09B 33/22; C09B 35/32; C09B 35/38; D06P 3/32
[52] U.S. Cl. ..................... 260/159; 260/160; 260/169; 260/167; 260/173; 260/198
[58] Field of Search ........................ 260/159

[56] References Cited

U.S. PATENT DOCUMENTS 2,259,735 10/1941 Crossley et al. ............. 260/159 X
2,656,346 10/1953 Knecht et al. ................. 260/159
2,676,957 4/1954 Armento ...................... 260/159 X
3,467,645 9/1969 Keller et al. ................. 260/161 X

FOREIGN PATENT DOCUMENTS 2500426 7/1975 Fed. Rep. of Germany ...... 260/159
2501827 7/1975 Fed. Rep. of Germany ...... 260/159
1109435 1/1956 France ........................... 260/169

OTHER PUBLICATIONS

Reichel et al., "The Journal of the Society of Dyers and Colourists", vol. 74, 1958, p. 598, 2nd Paragraph.

Primary Examiner—Floyd D. Higel
Attorney, Agent, or Firm—Beveridge, DeGrandi and Kline

[57] ABSTRACT

Dyestuff of the formula:

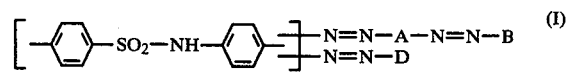

in which A represents a mono- or disulphonated naphthalene residue which is unsubstituted or substituted by a hydroxy group and/or by an amino group, B represents an aliphatic, aromatic or heterocyclic residue and D represents the residue of a pyrazolone or an ester or amide of β-ketonic acid; process for the coloration of animal or polyamide fibres in which the coloring agent is a dyestuff of the above formula and articles based on animal or polyamide fibres colored by means of such a dyestuff.

1 Claim, No Drawings

HYDROSOLUBLE PYRAZOLONE TRISAZO DYESTUFFS DERIVED FROM 4,4'-DIAMINO-BENZENESULFANILIDE

This application is a continuation of application Ser. No. 541,956 filed Jan. 17, 1975 and now abandoned.

The present invention relates to new trisazo dyestuffs which are soluble in water and which are particularly suitable for dyeing animal fibres, such as wool, silk and especially leather, and also for dyeing polyamide fibres.

Direct dyestuffs derived from benzidine are usually used for dyeing leathers. However, it is rare for one and the same dyestuff to have good affinity for all types of leathers, such as: clear chrome leathers, semi-chrome leathers and vegetable tanned leathers. Thus, for example, the dyestuff which is identified in the Colour Index as Direct Black 38 (No. 30235) and which is often used for dyeing clear chrome leathers in black shades exhibits only poor affinity for mixed tanning leathers: chrome salt+synthetic tannin or chrome salt+vegetable tannin (semi-chrome leathers). Moreover, this dyestuff does not produce colourations which penetrate into those leathers sufficiently which are to be pumiced or sueded after dyeing; also, its stability in an acidic medium is very poor.

It has now been found that the dyestuffs corresponding to the general formula:

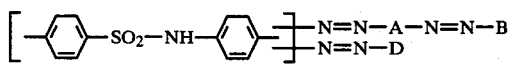

in which A represents a mono- or disulphonated naphthalene residue which is possibly substituted by a hydroxy group and/or by an amino group, B represents an aliphatic, aromatic or heterocyclic residue, and D represents the residue of a pyrazolone or an ester or amide of β-ketonic acid, are particularly suitable for dyeing all types of leathers; the penetration of the dyestuff is of such an excellent standard that practically no modification in the intensity of the shade is found during pumicing or sueding of the leather.

The dyestuffs of formula (I) are soluble in water and exhibit excellent fastness and stability to acids. On leather they produce uniform colourations which have penetrated well into the leather and which are fast to light, washing, dry-cleaning, dry and wet rubbing and perspiration. They may also be used for dyeing wool, silk and polyamide fibres.

The dyestuffs of the general formula (I) which are particularly interesting are those which, in the free acid state, correspond to the following formulae:

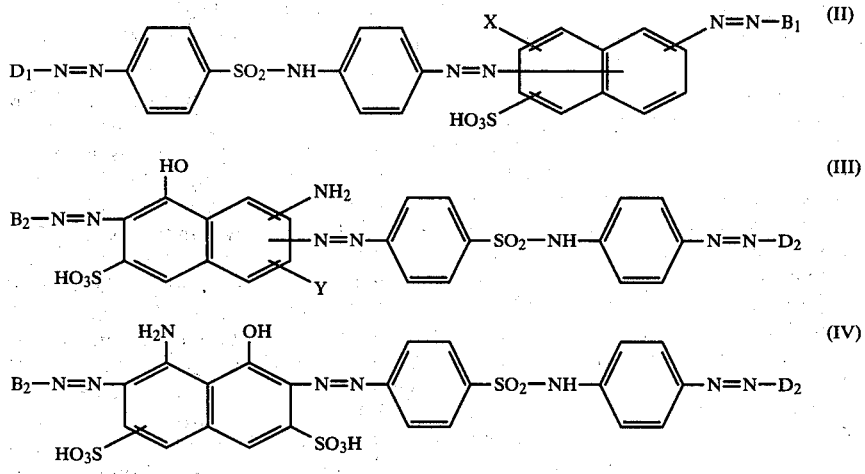

in which X represents a hydrogen atom or a hydroxy group, Y represents a hydrogen atom or a sulphonic acid group, $B_1$ represents the residue of a hydroxylated benzene or naphthalene coupling component, $B_2$ represents the residue of a diazotizable primary aromatic amine, $D_1$ represents the residue of a pyrazolone and $D_2$ represents the residue of a pyrazolone, an ester of acetoacetic acid or an anilide of this acid.

The dyestuffs according to the invention may be prepared for example from the bis-diazo derivative of 4,4'-diamino benzene-sulphanilide according to processes which are known per se. This derivative may, for example, be coupled, on the one hand, with an amino and/or hydroxy-naphthalene-mono or disulphonic acid, or an azo derivative of such an acid and, on the other hand, with a coupling component of formula D—H where D has the meaning given above.

The dyestuffs of formula (II), which dye leathers from different tannings in brown shades, may be prepared for example by coupling the bis-diazo derivative of one mole of 4,4'-diamino benzene-sulphanilide first of all with one mole of a coupling component of formula $D_1$-H, then with one mole of an amino-naphthalene-sulphonic acid possibly carrying a hydroxy group, diazotizing the disazo dyestuff thus obtained and coupling this with one mole of a coupling component of formula $B_1$-H and wherein $D_1$ and $B_1$ have the meanings given above.

The dyestuffs of formula (III), which dye leathers from different tannings in blue, green or black shades, may be prepared for example by coupling in acidic medium the bis-diazo derivative of one mole of 4,4'-diamino benzene-sulphanilide with one mole of an amino-naphthol-mono or -disulphonic acid, then coupling the azo-diazo derivative thus obtained with the diazo derivative of one mole of an aromatic amine of formula $B_2$-$NH_2$ and finally coupling the disazo-diazo compound thus obtained with one mole of a coupling component of formula $D_2$-H wherein $B_2$ and $D_2$ have the meanings given above.

The dyestuffs of formula (IV), which dye leathers from different tannings in greenish-blue to green shades, which are very fast to the usual tests, may be prepared for example by coupling in acidic medium the diazo derivative of one mole of an aromatic amine of formula $B_2$-$NH_2$ with one mole of 1-amino-8-hydroxy-naphthalene-3,6 (or 4,6-)-disulphonic acid, then coupling the monoazo dyestuff thus obtained with the bis-diazo derivative of one mole of 4,4'-diamino benzene-sulphanilide and finally coupling the disazo-diazo compound thus obtained with one mole of a coupling component of formula $D_2$-H wherein $B_2$ and $D_2$ have the meanings given above.

Examples of coupling components of formula $B_1$-H, which may be used for the preparation of the dyestuffs of formula (II), are more particularly (a) hydroxylated benzene derivatives such as phenol, resorcinol, 2,4,2',4'-tetrahydroxy diphenylmethane, 2-hydroxy benzoic acid, 3-amino 1-hydroxy benzene, 3-hydroxy diphenylamine and 3-hydroxy-2'-methyl diphenylamine; (b) naphthalene derivatives such as 2-hydroxy naphthalene and its derivatives monosulphonated in position 6 or 8 or its derivatives disulphonated in positions 3,6 or 6,8, 1,5-dihydroxy naphthalene, 1-hydroxy naphthalene-4(or 5)-sulphonic acid, 2-amino 8-hydroxy-naphthalene-6-sulphonic acid, 3amino 8-hydroxy-naphthalene-6-sulphonic acid, 1-amino 8-hydroxynaphthalene-3,6-disulphonic acid, 1-acetylamino 8-hydroxynaphthalene-3,6-disulphonic acid and 1-amino 8-hydroxynaphthalene-4,6-disulphonic acid.

Examples of coupling components of formulae $D_1$-H and $D_2$-H are 1-phenyl 3-methyl 5-pyrazolone possibly substituted on the phenyl group by a chlorine atom, 4'-sulpho-1-phenyl-5-pyrazolone-3-carboxylic acid and, in particular 4'- or 5'-sulpho-1-phenyl-3-methyl-5-pyrazolone possibly substituted on the benzene nucleus by one of two chlorine atoms.

Further examples of coupling components of formula $D_2$-H are ethyl acetylacetate, acetoacetanilide and its derivatives chlorinated, methylated, methoxylated or sulphonated on the benzene nucleus, in particular 3-sulpho-N-acetylacetylaniline.

Examples of diazotizable aromatic amines of formula $B_2$-$NH_2$ which may be used for the preparation of the dyestuffs of formulae (III) and (IV) are:

(a) benzenic amines such as aniline and its nitrated, chlorinated or methylated derivatives, 1-amino-benzene-2-, (-3- or -4-)-sulphonic acid and their nitrated, chlorinated or methylated derivatives, 1-amino-benzene-2,5-disulphonic acid, 4-amino 4'-nitro-diphenylamine-2'-sulphonic acid;

(b) naphthalenic amines such as α-naphthylamine, 1-aminonaphthalene-4-, -5-, -6-, or -7-) sulphonic acid and 1-amino-8-hydroxy-naphthalene-3,6-disulphonic acid.

Examples of amino-naphthol-mono- or disulphonic acids to be used for the preparation of the dyestuffs of formula (III) are, more particularly, 2-amino-8-hydroxynaphthalene-6-sulphonic acid, 3-amino 8-hydroxynaphthalene-6-sulphonic acid, 1-amino 8-hydroxynaphthalene-3,6-disulphonic acid and 1-amino 8-hydroxy-naphthalene-4,6-disulphonic acid.

The invention is illustrated by the following Examples in which the parts indicated are parts by weight.

EXAMPLE 1

26.3 parts of 4,4'-diamino benzene-sulphanilide are dissolved in 400 parts of water at 50° C. with the aid of 53 parts of a solution of 20° Bé hydrochloric acid. This is cooled to 5° C., a solution of 14 parts of sodium nitrite in 28 parts of water is added, the mixture is stirred for one hour at 5° C. and then the slight excess of nitrous acid is destroyed by the addition of a little sulphamic acid.

Then a solution of 25.4 parts of 4'-sulpho-1-phenyl-3-methyl 5-pyrazolone and 35 parts of sodium carbonate in 100 parts of a 5% solution of sodium hydroxide is added to the solution of the bis-diazo derivative thus obtained. When monocoupling is finished, a solution of 22.3 parts of 1-aminonaphthalane-6-sulphonic acid in 100 parts of water, which has previously been brought to pH 7 by the addition of an aqueous solution of sodium hydroxide, is added. This is allowed to react until coupling is finished, then 7 parts of sodium nitrite are added. The solution thus obtained is then introduced within the space of 30 minutes into a mixture of 70 parts of 20° Bé hydrochloric acid, 100 parts of water and 100 parts of ice. Diazotization is effected for 3 hours at 10° C., 9.4 parts of phenol are added, then 40 parts of sodium carbonate are added, and this is left to react until coupling is finished. The trisazo dyestuff is isolated in accordance with conventional processes. It dyes leathers from different tannings in an orange-brown shade which is fast to the usual tests.

The following Table gives other examples of dyestuffs of formula (II) which have been prepared as in Example 1.

TABLE 1

| Ex. | $D_1$—H Coupling component | Amino-naphthalene-sulphonic acid | $B_1$—H Coupling component | Shade on leather |
|---|---|---|---|---|
| 2 | 4'-sulpho-1-phenyl-3-methyl-5-pyrazolone | 1-amino-naphthalene-6-sulphonic acid | 1,3-dihydroxy benzene | reddish-brown |
| 3 | 4'-sulpho-1-phenyl-3-methyl-5-pyrazolone | 1-amino-naphthalene-6-sulphonic acid | 2-hydroxy naphthalene | violet-brown |
| 4 | 4'-sulpho-1-phenyl-3-methyl-5-pyrazolone | 1-amino-naphthalene-6-sulphonic acid | 2-amino-8-hydroxy-naphthalene-6-sulphonic acid | blackish-brown |
| 5 | 4'-sulpho-1-phenyl-3-methyl-5-pyrazolone | 2-amino 8-hydroxy-naphthalene-6-sulphonic acid | 1,3-dihydroxy benzene | reddish-brown |
| 6 | 4'-sulpho-1-phenyl-3-methyl-5-pyrazolone | 2-amino 8-hydroxy-naphthalene-6-sulphonic acid | 2-hydroxy-naphthalene | very reddish brown |
| 7 | 4'-sulpho-1-phenyl-3-methyl-5-pyrazolone | 2-amino 8-hydroxy-naphthalene-6-sulphonic acid | 2-amino-8-hydroxy-naphthalene-6-sulphonic acid | violet blackish-brown |

EXAMPLE 8

As indicated in the first paragraph of Example 1, 26.3 parts of 4,4'-diamino benzene-sulphanilide are bis-diazotized. Within the space of 30 minutes a solution of 34.1 parts of the monosodium salt of 1-amino-8-hydroxy-naphthalene-3,6-disulphonic acid in 100 parts of water and 13 parts of a solution of 36° Bé sodium hydroxide is added. Then, within the space of one hour, the pH of the mixture is brought up to 3.5 by the addition of a 20% solution of sodium carbonate and monocoupling is allowed to occur at 5° C. When it is finished, the diazo derivative of 9.3 parts of aniline is added, then 50 parts of sodium carbonate are added. When coupling of the diazo derivative of aniline is finished a solution of 17.4 parts of 1-phenyl-3-methyl-5-pyrazolone in 100 parts of water is added. The trisazo dyestuff which is formed is then isolated in accordance with conventional processes. It dyes leathers from different tannings in a greenish-black shade which is particularly fast to the usual tests.

EXAMPLE 9

If, in the preceding Example, the 1-amino-8-hydroxy-naphthalene-3,6-disulphonic acid is replaced by the same quantity of the monosodium salt of 1-amino-8-hydroxy-naphthalene-4,6-disulphonic acid, a dyestuff is obtained which has a similar shade and similar properties.

Table 2 set out below gives other Examples of dyestuffs of formula (III) which have been prepared as in Example 8, but the aniline has been replaced by the amine $B_2$-$NH_2$ which is indicated in the second column and/or the 1-phenyl-3-methyl-5-pyrazolone has been replaced by the coupling component $D_2$-H which is indicated in the third column.

TABLE 2

| Ex. | $B_2$—$NH_2$ Amine | $D_2$—H Coupling component | Shade on leather |
|---|---|---|---|
| 10 | 2-nitro aniline | 1-phenyl-3-methyl 5-pyrazolone | dark yellowish-green |
| 11 | 4-nitro aniline | 1-phenyl-3-methyl 5-pyrazolone | dark yellowish-green |
| 12 | 1-amino-benzene-4-sulphonic acid | N-acetylacetyl-aniline | greenish-blue |
| 13 | 1-amino-benzene-4-sulphonic acid | 2-chloro N-acetylacetyl-aniline | very bluish-green |
| 14 | 1-amino-benzene-4-sulphonic acid | 2-methyl N-acetylacetyl-aniline | greenish-blue |
| 15 | 1-amino-benzene-4-sulphonic acid | 2-methoxy N-acetylacetyl-aniline | greenish-blue |
| 16 | 1-amino-benzene-4-sulphonic acid | ethyl acetylacetate | greenish-blue |
| 17 | 4-nitro aniline | 4'-sulpho-1-phenyl-3-methyl-5-pyrazolone | dark yellowish-green |
| 18 | 2-nitro aniline | 2',5'-dichloro-4'-sulpho-1-phenyl-3-methyl-5-pyrazolone | dark yellowish-green |
| 19 | 2-nitro aniline | 4'-sulpho-1-phenyl-3-methyl-5-pyrazolone | dark yellowish-green |

EXAMPLE 20

Within the space of one hour a solution at pH 6.5 of 34.1 parts of the monosodium salt of 1-amino-8-hydroxy-naphthalene-3,6-disulphonic acid is added to the diazo derivative which has been prepared according to the conventional process from 13.8 parts of 4-nitro aniline. When coupling is finished, the solution of 4'-nitro-2-phenylazo-1-amino-8-hydroxy-naphthalene-3,6-disulphonic acid thus obtained is introduced within the space of one hour into the solution of the bis-diazo derivative of 26.3 parts of 4,4'-diaminobenzene-sulphanilide, then, within the space of one hour, a solution of sodium carbonate is added to attain a pH close to 6. When coupling is finished a solution of 17.4 parts of N-acetylacetyl-aniline in 100 parts of a 40 g/l solution of sodium hydroxide is added, then 30 parts of sodium carbonate are added. Coupling is allowed to take place then the trisazo dyestuff formed is isolated according to conventional processes. It dyes leathers from different tannings in a very greenish dark blue, which is fast to the usual tests.

Table 3 set out below gives other Examples of dyestuffs of formula (IV) which have been prepared as in Example 20, but the N-acetylacetyl-aniline has been replaced by the coupling component $D_2$-H which is indicated in the second column and/or the 4-nitro aniline has been replaced by the amine $B_2$-$NH_2$ which is indicated in the third column.

TABLE 3

| Ex. | $D_2$H Coupling component | $B_2$—$NH_2$ Amine | Shade on leather |
|---|---|---|---|
| 21 | ethyl acetylacetate | 4-nitro aniline | dark greenish-blue |
| 22 | N-acetylacetyl-aniline | 2-amino-5-nitro-benzene-sulphonic acid | dark bluish-green |
| 23 | ethyl acetylacetate | 2-amino-5-nitro-benzene-sulphonic acid | dark greenish-blue |
| 24 | N-acetylacetyl-aniline | 4-amino-2,5-dichloro-benzene-sulphonic acid | dark bluish green |
| 25 | ethyl acetylacetate | 4-amino-2,5-dichloro-benzene-sulphonic acid | dark bluish green |
| 26 | N-acetylacetyl-aniline | 1-amino-benzene-2,5-sulphonic acid | dark bluish green |
| 27 | ethyl acetylacetate | 1-amino-benzene-2,5-sulphonic acid | very dark bluish green |

EXAMPLE 28

100 parts of a clear chrome box-calf are rinsed, neutralized, then rinsed again. The box-calf is then introduced into a fulling mill containing one part of the dyestuff of Example 10 in 500 parts of water at 60° C. Fulling is effected for 45 minutes at 60° C. then a tawing paste which is put in suspension in 50 parts of water with the aid of a dispersing agent is introduced. Fulling is effected for a further 30 minutes, then the conventional treatments are carried out.

The box calf is dyed uniformly in a dark, yellowish-green shade which is particularly fast to the usual tests.

EXAMPLE 29

In the presence of a little ammonia, 100 parts of a clear chrome velvet calfskin are remoistened, then it is introduced into a fulling mill containing a solution of 6 parts of the dyestuff of Example 10 in 2000 parts of water at 60° C. Fulling is effected for one hour in 60° C., then 3 parts of an 85% solution of formic acid are introduced. Fulling is effected for a further 30 minutes, then the calfskin is rinsed, dried and subjected to conventional treatments. A leather is obtained which is dyed uniformly throughout its thickness in a dark yellowish-green shade which is particularly fast to the usual tests.

EXAMPLE 30

100 parts of a sheepskin, which had been chrome-tanned and retanned with the aid of a synthetic or vegetable tannin, are remoistened in the presence of a little ammonia. It is then introduced into a fulling mill containing a solution of 6 parts of the dyestuff of Example 10 in 2000 parts of water at 60° C. Fulling is effected for one hour at 60° C. then 3 parts of an 85% solution of formic acid are introduced. The sheepskin is fulled for a further 30 minutes at 60° C., rinsed and dried. A sheepskin is obtained which is dyed uniformly throughout its thickness in a dark yellowish-green shade which is particularly fast to the usual tests.

We claim:

1. A dyestuff which in the free acid state is represented by the formula:

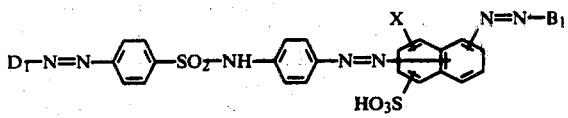

wherein
X is hydrogen or hydroxy;
$B_1$ is the residue of hydroxylated benzene or naphthalene coupling component; and
$D_1$ is the residue of a pyrazolone.

* * * * *